US012623249B1

(12) United States Patent
Tomkins et al.

(10) Patent No.: US 12,623,249 B1
(45) Date of Patent: May 12, 2026

(54) COATING AND CURING A PROTECTIVE LAYER ON LARGE FORMAT PRINTED GRAPHICS

(71) Applicants: Glenn Tomkins, Windsor, WI (US); Hayes Holzhauer, Scottsdale, AZ (US); Brian Buisker, Fitchburg, WI (US)

(72) Inventors: Glenn Tomkins, Windsor, WI (US); Hayes Holzhauer, Scottsdale, AZ (US); Brian Buisker, Fitchburg, WI (US)

(73) Assignee: ADVANCED GREIG LAMINATORS, INC., Deforest, WI (US)

( * ) Notice: Subject to any disclaimer, the term of this patent is extended or adjusted under 35 U.S.C. 154(b) by 77 days.

(21) Appl. No.: 18/381,625

(22) Filed: Oct. 18, 2023

Related U.S. Application Data

(63) Continuation-in-part of application No. 18/216,472, filed on Jun. 29, 2023.

(60) Provisional application No. 63/336,628, filed on Apr. 29, 2022.

(51) Int. Cl.
*B05C 11/02* (2006.01)
*B05C 3/12* (2006.01)
*B05C 9/12* (2006.01)
*B05C 13/00* (2006.01)

(52) U.S. Cl.
CPC .............. *B05C 13/00* (2013.01); *B05C 3/125* (2013.01); *B05C 9/12* (2013.01); *B05C 11/025* (2013.01)

(58) Field of Classification Search
None
See application file for complete search history.

(56) References Cited

U.S. PATENT DOCUMENTS

| | | | |
|---|---|---|---|
| 1,043,021 A | 10/1912 | Mayer | |
| 1,283,851 A | 11/1918 | Mayer | |
| 1,288,641 A | 12/1918 | Mayer | |
| 1,837,562 A | 12/1931 | Mayer | |
| 2,146,507 A | 2/1939 | Mayer | |
| 2,285,041 A | 6/1942 | Mayer et al. | |
| 2,322,533 A | 6/1943 | Mayer | |
| 4,619,050 A * | 10/1986 | Klemm | F26B 3/28 34/68 |

(Continued)

FOREIGN PATENT DOCUMENTS

| | | |
|---|---|---|
| DE | 102021112174 A1 | 11/2022 |
| DE | 102021121591 A1 | 2/2023 |
| TW | 201938393 A | 10/2019 |

*Primary Examiner* — Binu Thomas
(74) *Attorney, Agent, or Firm* — Bycer & Marion, PLC; Matthew L. Bycer

(57) ABSTRACT

A device and method for coating and curing a protective layer on large format graphics comprises a roll-to-roll machine having a coat stage and a cure stage. A roll of printed web material turns about a load reel, passing through the coat stage and cure stage, and is wound around a finish reel. The load and finish reels may be driven by servo-motors. The coat stage comprises a coat pan which is partially filled with coating liquid and a Mayer bar for removing excess coating liquid. The cure stage comprises a light source and a plate. One or more devices, such as idler rollers, dancer rollers, stationary rollers, or load cells, are placed between the load and finish reels to control the path, tension, and speed of the web material.

15 Claims, 5 Drawing Sheets

(56) References Cited

U.S. PATENT DOCUMENTS

| | | | | | |
|---|---|---|---|---|---|
| 5,853,801 | A * | 12/1998 | Suga | G02B 5/3016 | 427/407.1 |
| 6,812,982 | B2 * | 11/2004 | Ishizuka | G02B 5/3016 | 427/72 |
| 2003/0170391 | A1 * | 9/2003 | Nishino | B05C 11/025 | 118/407 |
| 2006/0113421 | A1 * | 6/2006 | Gomes | B65H 23/0328 | 242/538 |
| 2009/0324842 | A1 * | 12/2009 | Tanaka | B05C 1/08 | 118/621 |
| 2010/0233381 | A1 * | 9/2010 | Yokoyama | B05C 1/0813 | 118/688 |
| 2015/0231663 | A1 * | 8/2015 | Kennett | B05C 11/025 | 118/672 |
| 2016/0346878 | A1 * | 12/2016 | Muraoka | B05C 3/125 | |
| 2022/0355336 | A1 | 11/2022 | Meisriemel | | |
| 2023/0058008 | A1 | 2/2023 | Scheerer et al. | | |

* cited by examiner

COATING AND CURING A PROTECTIVE LAYER ON LARGE FORMAT PRINTED GRAPHICS

CLAIM OF PRIORITY

The present continuation-in-part application includes subject matter disclosed in and claims priority to patent application Ser. No. 18/216,472 filed Jun. 29, 2023, and entitled "Coating and Curing a Protective Layer on Large Format Printed Graphics", and provisional application Ser. No. 63/336,628 entitled "Coating and Curing a Protective Layer on Large Format Printed Graphics" filed Apr. 29, 2022, both describing inventions made by the present inventor, and herein incorporated by reference.

BACKGROUND OF THE INVENTION

1. Field of the Invention

The present invention relates to web printing, and more particularly to a method and apparatus for coating printed rolls of large format images with a protective coating and curing.

2. Description of Related Prior Art

Large format graphics include signage placed on trailers of semi-trucks, vehicle wraps, wall murals, wallpaper, posters, and event banners. The graphics are printed using inks or dyes on large rolls of web material, such as paper, fabric, or vinyl. Large format graphics processes are also used to simultaneously make many smaller impressions, such as food container labels. After the labels are printed, they are cut out of the web to the desired smaller size.

Often the graphics are used outdoors and exposed to the sun's ultraviolet rays, frigid and boiling temperatures, precipitation, and a wide range of humidity. To protect the graphics from fading and degrading, a protective layer is often applied on top of the printed web. Similarly, food labels are exposed to harsh environments and a protective layer is applied. In addition to protection from environmental damage, food labels have to be coated to protect the food and food handler in case of accidental contact with the food. Wallpaper used for commercial interiors such as hallways and common areas are often coated with a protective layer, too.

Typically, large format graphics are printed using a web or roll-to-roll process, the benefits of which includes high output rates and long rolls of product enabling larger signs. The leading edge of a large roll of web material is fed into a roll-to-roll machine, which unrolls the web material from a first reel as it is continuously printed by digital, screen printing, or flexographic methods. The printed web material is continuously re-rolled onto a second reel. The printed web material is then ready for a protective layer.

To apply the protective layer, the leading edge of the second reel is fed into a separate roll-to-roll machine. The protective layer is applied by one of several methods, including laminating a coating to the printed web material by heat, pressure or adhesive; screen printing a protective layer; or roll-coating the protective layer. These processes, however, are relatively slow due to the cure or dry time of the protective material. In addition, while a laminating process creates a smooth surface, the screen printing and roll-coating methods leave a tell-tale surface pattern, which can detract from the underlying image. It would be desirable to apply a smooth protective coating to a large format printed web material quickly, which increases the volume of production possible in a given amount of time and lowers the cost.

Large format graphics are often installed by applying the printed image to a desired object by adhering the back of the graphic to the surface of the object. Adhered graphics can be removed, leaving the original surface in good condition for applying another graphic. The case of application and removal is dictated by several factors, including the type and thickness of the web material. Graphics made from a thin web material tends to fold upon itself, making installation tricky. Thin graphics tend to peel off in tiny pieces, making removal tedious. Graphics with thicker web material are easier to install and remove but are more difficult to process. It would be desirable to manufacture graphics using thicker web material yet maintain higher production speed and quality.

It is therefore a primary object of the present invention to provide a coating system and method.

These and other objects of the present invention will become apparent to those skilled in the art as the description thereof proceeds.

SUMMARY OF THE INVENTION

The present invention is directed to a device for coating and curing a protective layer on large format graphics comprises a roll-to-roll machine having a coat stage and a cure stage. A roll of printed web material turns about a load reel, passing through the coat stage and cure stage, and is wound around a finish reel. The load and finish reels may be driven by servo motors. The coat stage comprises a coat pan which is partially filled with coating liquid and a Mayer bar for removing excess coating liquid. The cure stage comprises ultraviolet LEDs and a cover to limit the escape of the UV rays. One or more devices, such as idler rollers, dancer rollers, stationary rollers, or load cells, are placed between the load and finish reels to control the path, tension, and speed of the web material.

The coating liquid is curable by UV energy and, once cured, protects the printed image from fading due to solar UV rays and protects the web from degradation due to environmental conditions. Preferably the web material is a vinyl mesh that is 2-4 mils (thousandths of an inch) thick.

BRIEF DESCRIPTION OF THE DRAWINGS

The present invention will be described with greater specificity and clarity with reference to the following drawings, in which.

DETAILED DESCRIPTION OF THE PREFERRED EMBODIMENTS

Figure 1:
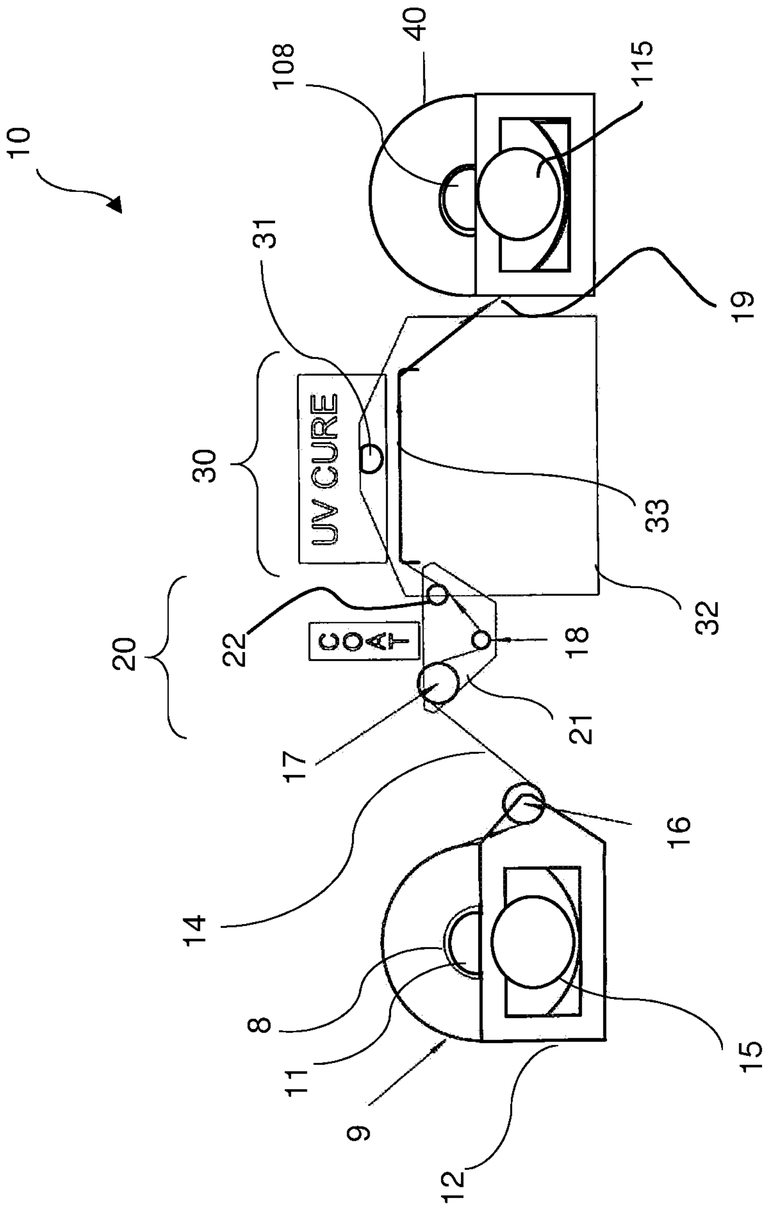
FIG. 1 is a schematic illustration of a cross-section of one embodiment of the coating apparatus.
Figure 2:
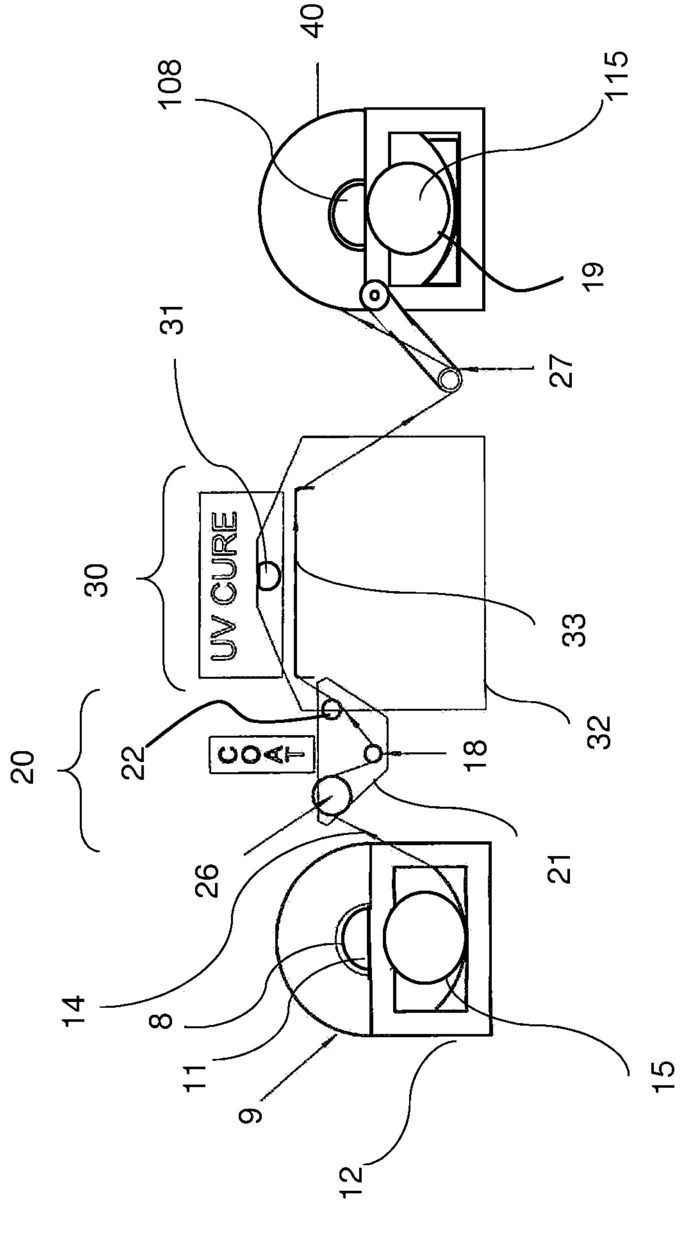
FIG. 2 is a schematic illustration of a cross-section of a second embodiment of the coating apparatus.

An apparatus for coating and curing a protective layer on large format graphics comprises a roll-to-roll machine 10 having a coat stage 20 and a cure stage 30. FIGS. 1 and 2 illustrate two embodiments of the device.

First, printed web material 14 is obtained by printing web materials with graphic images using inks or dyes. Typically, the web material is 60-90 inches wide and up to 120 feet long. Preferably the web material is vinyl that is between 2-4 mils thick. Other web materials such as polyester, nylon, woven fabric from natural materials, and paper may suffice. Once printed, the printed web material is wound about a core 8, which is hollow tube of metal, plastic, or cardboard.

At the load stage, a roll 9 of printed web material 14 is loaded onto a load reel 11 by inserting the load reel 11 into the core 8. Load reel 11 is slightly longer than the web material is wide so that the ends of the load reel extend beyond roll 9 and can be inserted into frame or box enclosure 12. Typically, load reel 11 is a long metal rod. Load reel 11 rotates to unwind the roll 9 and is typically motorized by a servo motor 15. Alternatively, the load reel 11 may spin freely, allowing the finish reel 40 to pull the web material through the roll-to-roll machine 10. A manual or electronic brake may be used to help control the spin speed of the roll 9 as it unrolls.

Coat stage 20 comprises a coat pan 21 which is partially filled with coating liquid and a wet film applicator. In the preferred embodiment, the coating liquid is a clearcoat that is cured by UV wavelengths. With the proper viscosity and solids content, an accurate thickness of coating from fractions of a mil and up can be achieved with this coating method. Preferably the resulting cured coating thickness is about 2-20 mils.

Preferably the wet film applicator 22 is a metal rod with formed grooves that simulates a wound-wire Mayer bar but is easier to clean. Other wet film applicators may be used, such as wound-wire Mayer bars, drawdown bars, squeegees, and Bird blades with fixed gaps for a single desired film thickness. As is known in the art, a Mayer Bar (a.k.a. Mayer Rod, equalizer bar, doctor bars, metering bar, coating rod, smoothing rod, sizer bar, Meyer rods, etc. as initially introduced by Charles W. Mayer) is a prominent method of coating that is used to evenly apply the viscous and semi-viscous liquids like paints, printing inks, adhesives, and lacquers. A Mayer rod is a stainless-steel rod that is wound tightly with stainless steel wire of varying diameter. The rod is used to doctor the excess coating solution and control the coating weight. The wet thickness after doctoring is controlled by the diameter of the wire used to wind the roll and is approximately 0.1 times the wire diameter. Rods are available in a wide variety of wire sizes to give a range of coating weights. U.S. Patents to Charles W. Mayer, including U.S. Pat. No. 10,403,021 for a Coating Machine (Oct. 29, 1912); U.S. Pat. No. 1,283,851 for a Coating Machine (Nov. 5, 1918); U.S. Pat. No. 1,288,641 for a Coating Machine (Dec. 24, 1918); U.S. Pat. No. 2,285,041 for a Coating Machine (Jun. 2, 1946); U.S. Pat. No. 183,756 for a Cylinder for paper coating machines and the like (Dec. 12, 1922); U.S. Pat. No. 2,146,507 for a Coating Machine (Feb. 7, 1939), U.S. Pat. No. 2,322,533 for a Coating Machine (Jun. 22, 1943), are all herein incorporated by reference.

Cure stage 30 comprises a series of energy sources having wavelengths that cure or dry the coating liquid. In the preferred embodiment, the energy sources emit ultraviolet wavelengths, and the energy sources are light-emitting diodes ("LEDs") 31. Other light sources or laser diodes may suffice. The energy sources are housed inside a housing or under a cover 32, which limits the amount of UV energy escaping out of the machine.

At the finish stage, the roll 9 of coated, cured and printed web material 14 is wound onto a core 8 that has been mounted onto a finish reel 40. The finish reel 40 is motorized, preferably driven by servo motors 15.

One or more devices, such as idler rollers, dancer rollers, stationary rollers, or load cells, are placed between the load and finish reels to control the path, tension, and speed of the web material.

In one embodiment shown in FIG. 1, a 16" diameter roll 9 of the printed web material 14 sits in a frame 12. The core 8 of the roll is preferably 3" in diameter. The ends of the load reel 11 are rotatably and removably connected to the frame and rotate freely relative to it. An electronic brake (not shown) helps control the rotation of the roll 9. The web 14 passes under an idler roller 16 on its way to the coat stage 20. As it is drawn into the coat pan 21, the web 14 passes over a load cell 17 which helps sense and control the tension on the web 14. The web 14 passes under a Teflon® bar 18 (non-rolling) that is submerged in the coating liquid, so that the web 14 is coated with coating liquid. The web 9 is drawn past the Mayer bar 22, which scrapes excess coating liquid from the web much like a squeegee. The excess coating liquid drips back into the coat pan 21 for reuse. The leading edge of the printed web material 9 is then passed to the cure stage 30, where it is drawn across and above plate 33 under the UV LEDs. Preferably the web material does not touch the plate. Plate 33 acts as a heat sink to dissipate the heat of the UV LEDs. Finally, the printed, UV coated and cured web material is wound onto a core 108 that has been mounted onto the finish reel 40. The finish reel 40 is driven by a servo motor 115.

In a second embodiment shown in FIG. 2, preferably a 16" diameter roll 9 of the printed web material 14 sits in a frame 12. The core 8 of the roll is preferably 3". The ends of the load reel 11 are rotatably and removably connected to the frame and rotate freely relative to it. An electronic brake 19 helps control the rotation of the roll 9. As it is drawn into the coat pan 21, web 14 passes over an idler roller 26. The web 14 passes under a Teflon® bar 18 (non-rolling) that is submerged in the coating liquid, so that the web 9 is coated with coating liquid. Web 9 is drawn past the Mayer bar 22, which scrapes excess coating liquid from the web much like a squeegee. The excess coating liquid drips back into the coat pan 21 for reuse. The leading edge of the printed web material 9 is then passed to the cure stage 30, where it is drawn across and above plate 33 under the UV LEDs. Preferably the web material does not touch the plate. Plate 33 acts as a heat sink to dissipate the heat of the UV LEDs. Finally, the printed, UV coated and cured web material is drawn over a dancer roller 27 and wound onto a core 8 that has been mounted onto the finish reel 40. The finish reel 40 is driven by a servo motor 15. As used herein a dancer roller, as is known in the art is a light-weight bar used for tension control, the dancer roller is allowed to float (rise/fall) as material feeds into the process. As the dancer roll rises and falls, the tension system is adjusting for minor changes in tension. In most well-designed systems, the dancer roll will rise and fall in small increments constantly. In a closed loop dancer unwind system, there are several key components: the dancer itself, a feedback potentiometer, a control, and the brake or drive. The goal in a dancer system is for the dancer to remain at the mid-point of travel. Pressure on the dancer establishes the tension for the web. The brake in the system controls how fast material is allowed to unwind. Brake pressure changes based on feedback from the dancer potentiometer to the control and from the control to the brake or drive. If the process is consuming material faster than the unwind is releasing material, the dancer will rise (the loop under the dancer will become shorter). If the process is consuming material slower than the unwind is releasing material, the dancer will fall (the loop under the dancer will become longer). In the simple dancer system, the dancer can rise and fall thirty degrees around its midpoint as changes occur. As this rise and fall occurs, the feedback potentiometer will provide a signal back to the control.

Figure 3:
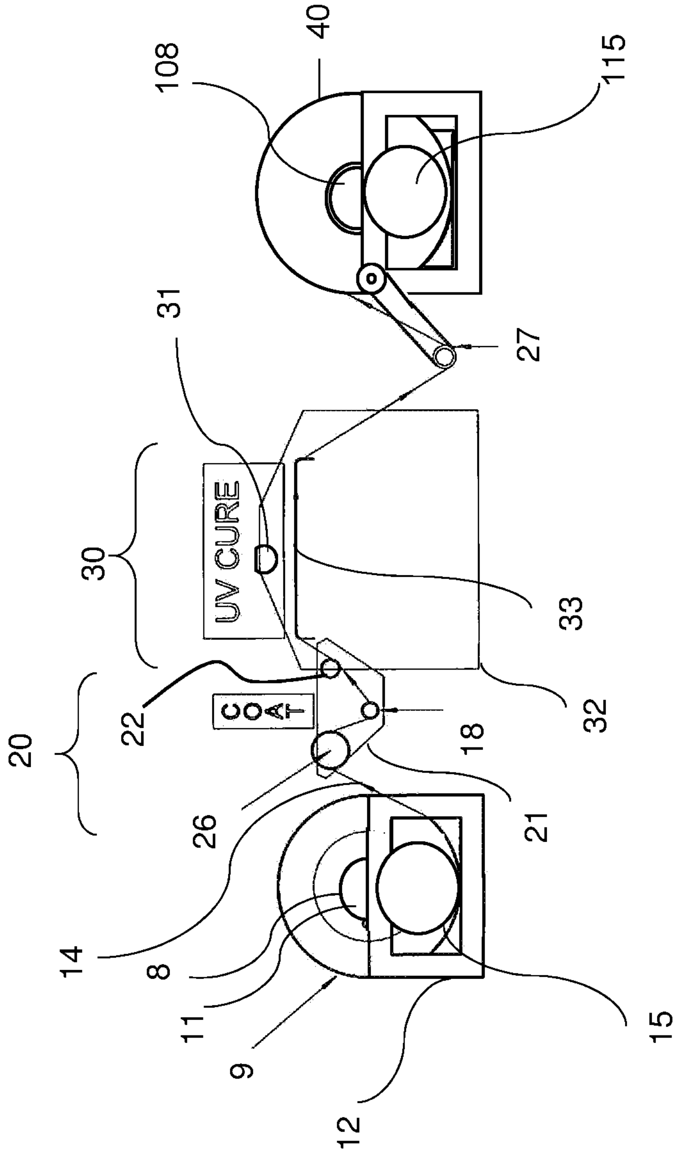
FIG. 3 is a schematic illustration of a cross-section of a third embodiment of the coating apparatus.

In a third embodiment shown in FIG. 3, preferably a 16" diameter roll 9 of the printed web material 14 sits in a frame 12. The core 8 of the roll is 3". The ends of the load reel 11 are rotatably and removably connected to the frame. The load reel 11 is rotated by a servo motor 15. As it is drawn into the coat pan 21, the web 14 passes over an idler roller 26.

The web 14 passes under a Teflon® bar 18 (non-rolling) that is submerged in the coating liquid, so that the web 9 is coated with coating liquid. The web 9 is drawn past the Mayer bar 22, which scrapes excess coating liquid from the web much like a squeegee. The excess coating liquid drips back into the coat pan 21 for reuse. The leading edge of the printed web material 9 is then passed to the cure stage 30, where it is drawn across and above plate 33 under the UV LEDs. Plate 33 acts as a heat sink to dissipate the heat of the UV LEDs. Finally, the printed, UV coated and cured web material 14 is drawn over a dancer roller 27 and wound onto a core 8 that has been mounted onto the finish reel 40. The finish reel 40 is driven by a servo motor 115.

Figure 4:
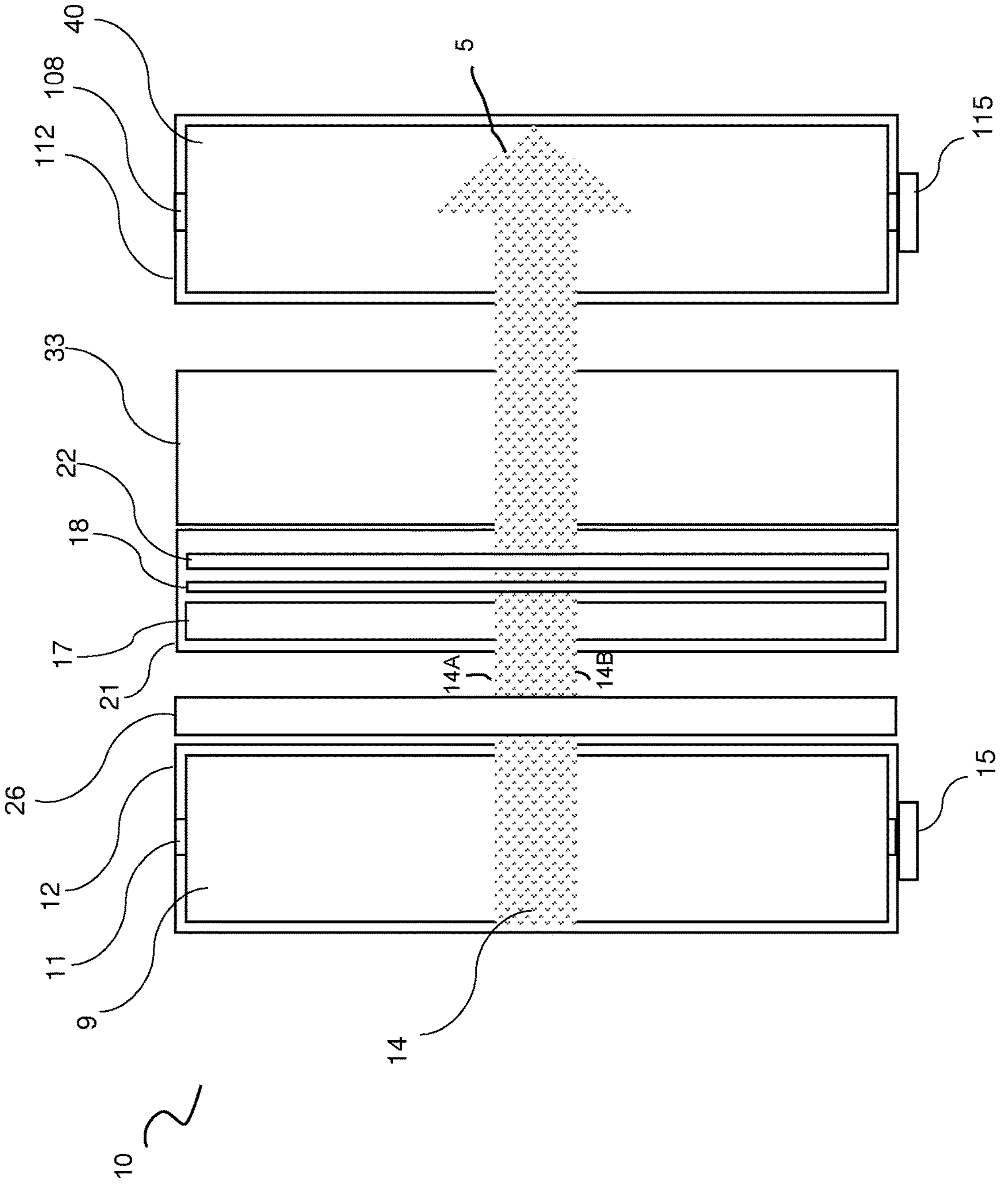
FIG. 4 is a schematic illustration of a top view of the first embodiment of the coating apparatus without the cover.

FIG. 4 shows a top view of the embodiment of the coating apparatus in FIG. 1 shown without the cover. The combination of the effects of the grooved or wound-wire web film applicator, UV energy sources, and UV-curable coating liquid produces a smooth, clear, UV-, wear-, and weather-resistant protective coating which can be applied at 10-20 times the speed of a conventional laminating process. Overarching arrow 5 on web 14 demonstrates the direction of movement through the system machine 10. As seen, load reel 11 support roll 9 to provide webbing to pass through the system 10. Roller and roll are preferably held within box enclosure 12. Webbing is set through the system to allow the servo motors 15 and 115 to activate and run at similar or same speeds (modified based on tension and/or width of remaining/collected roll diameter thereon). Once webbing is set, system processing can begin. In an alternative process, the webbing can be run by holding exposed side ends 14A and 14B and manually feeding through parts of system to allow curing of ends of roll (preferably webbing material is wider than shown) and up to the width of the system (less a few inches).

Webbing material 14 is passed over idler roller to align the webbing and provide tension to maintain webbing taut. Webbing is then pulled and fed around load cell 17 and forced/dunked into coat pan 17 and then run across Teflon® bar 18 in the liquid in coat pan, and then pressed against film applicator/Mayer bar 22 to remove excess. Webbing is then passed into Cure stage 30 and pulled over plate 33 (while exposed to curing lights 31 (not shown). Preferably, the process is continuous at a slow enough pace to allow for curing to take place, however, stop/start processing will also allow for portions to be exposed and moved on, given the appropriate length exposed in cure station, most preferably the length of the exposed cure station or a set divisible portion thereof. Webbing, either fed before the system is activated, or during the processing, is then drawn into finish reel 40 over core 8 and affixed thereto (e.g., by temporary glue, permanent affixing (to be cut out later), tape or as otherwise known in the art. As core 8 in finishing box enclosure 112 is rolled, finish reel 40, and pulled/drawn by force of servo motor 115. As webbing is pulled, brake 19 art finishing reel can stop servo motor 115 or simply hold webbing from progressing and thus halt movement of webbing through system.

Figure 5:
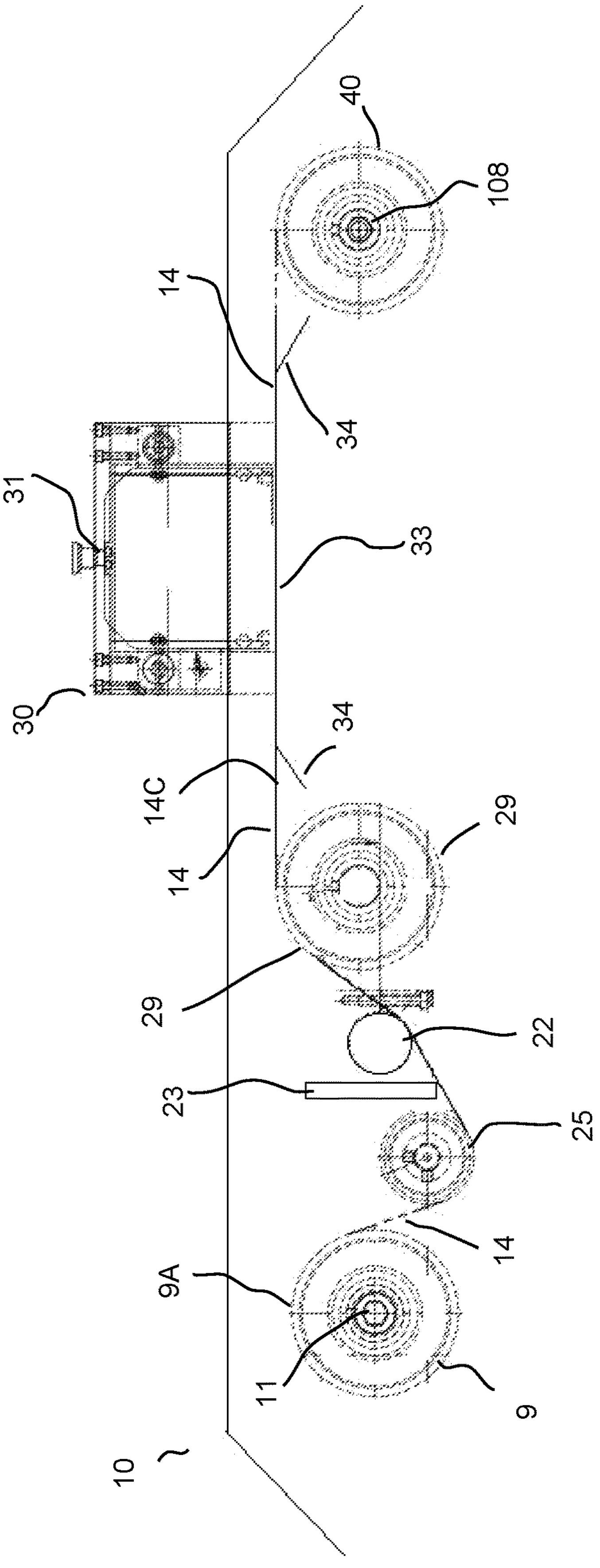
FIG. 5 is a schematic illustration of a cross-section of a fourth embodiment of the coating apparatus.

FIG. 5 demonstrates an improved version of the coating machine. Angles shown are preferred to be within the range of +/−five degrees, and the dimensions changed relative to one another no more than 50% to 200%. Dimensions and relative sizes are approximated to a working system, and may be used to build such a system. Webbing 14 starts from roll 9 over TEFLON coated load reel 11, reel 11 may alternatively not be coated. Web is unreeled by motor 15 (not shown) and drawn down and under containment roller 25. In this embodiment, the roll 11 is unrolled from top 9A of reel 9. Webbing 14 is drawn down under Teflon coated containment roller 26, and preferably pulled taut. Coating may be applied in a coat pan, or by a sprayer (system) 23, where it is pressurized or dropped onto webbing. Metering bar 22 applies film and/or draws off excess and/or doctors the coating to the desired thickness pattern by means of the wire coils around rod as is known in the art onto top p surface 14C of webbing 14. Webbing is then drawn over Teflon coated roller 29 with webbing top surface 14C bent over roller bar 29. Coating is applied by sprayer or applicator 24 and webbing passes under wet-film applicator metering bar 22. Sprayers 23 may be set in an array along a line to provide detailed coloration of the pattern on the webbing, for instance to draw figures or shapes in ink. In such a case, sprayers may be set within distance from webbing top surface 14C and arrayed in proximity with one another in small enough measure to create the appropriate resolution of the image applied. Even when applying an adhesive, the array of sprayers may be useful to minimize contact with air and roll along surface of webbing. Preferably spray may atomize the coating liquid into tiny droplets that will lay and rest on webbing. In some embodiments, the Mayer bar may be used to not only limit thickness, uniform in thickness, but spread coating over entire surface of webbing and minimize variations of quantity applied due to the placement of the sprayers.

Web passes a further TEFLON coated roller 29 to align with plate 33, upon which webbing is web is exposed to curing light 31 and maintains contact with plate 33 in curing stage. The top of roller 29 is preferably aligned in height with plate 33 so the webbing is drawn as though on a horizontal surface across roller 29 over plate 33 and onto reel finishing reel 40. The height of lights 31 in the curing station 30 may be adjusted to concentrate light/energy form lights onto the webbing and webbing top surface. The curing station can also be lifted to provide access to the webbings should the system need maintenance, or access to the webbing should any issues occur. Preferably, core 108 is connected to a servo-motor to draw webbing onto roll 40, while the core 108 moves down as the reel rolls up and the diameter of material on reel expands so as to keep the webbing plate through process. Web is taken from curing stage 30 and rolled onto finish reel 40. Optional wing 34 may be used at fore and aft of curing station to help guide and support webbing into, through, and out of curing station, as well as to catch coating rolling off.

A multitude of coating fluids/materials may be applied through this system and method, including adhesives, but also inks, polymers, etc. and other materials that can be cured from a liquid or viscous form into a more solid/glass form with the application or exposure to heat and/or radiation, such as ultra-violet radiation, or other light wavelengths.

While there has been illustrated and described what is at present considered to be the preferred embodiment of the present invention, it will be understood by those skilled in the art that various changes and modifications may be made, and equivalents may be substituted for elements thereof without departing from the true scope of the invention.

We claim:

1. A liquid film coating machine comprising:

a load reel set upon a core housing a webbing material, feeding the webbing material downwards towards and below a containment roller, said webbing material fed upwards into a coating station and over a coated roller;

said coating station comprising a sprayer set between said containment roller and said coated roller said sprayer set above said webbing said sprayer adapted to spray downwards;

and further comprising a metering bar set between said sprayer and said coated roller, whereby said metering bar presses downwards and forwards on the webbing within the coating station;

a curing station receiving the webbing past the coating station, said curing station comprising a source of light and a plate, wherein a top of the coated roller is aligned with the plate such that the webbing may be fed horizontally from the top of the coated roller to the plate; and a finishing roller receiving webbing past the curing station into a finish reel, said finishing roller having a top aligned with the plate to receive the webbing horizontally thereover.

2. The liquid film coating machine of claim 1 further comprising a servo-motor unrolling the load reel.

3. The liquid film coating machine of claim 2 further comprising a second servo-motor pulling taught the finish reel.

4. The liquid film coating machine of claim 2 further comprising a dancer set between the curing station and the finish reel.

5. The liquid film coating machine of claim 1 further comprising an idler bar set between the coating station and cure curing station.

6. The liquid film coating machine of claim 1 further comprising a brake coupled to the load reel.

7. The liquid film coating machine of claim 1 wherein said sprayer comprises an array of sprayers set in a line transverse a direction set between the load reel and the finish reel.

8. The liquid film coating machine of claim 7 wherein said array of sprayer is offset from perpendicular from the webbing.

9. The liquid film coating machine of claim 1 wherein twenty to thirty degrees of a circumference of the metering bar is exposed to the webbing.

10. The liquid film coating machine of claim 9 wherein twenty-five degrees of a circumference of the metering bar is exposed to the webbing.

11. The liquid film coating machine of claim 1 wherein a distance between a center of the containment roller and a center of the metering bar is one-and-a-half inches to five-point-nine inches.

12. The liquid film coating machine of claim 11 wherein a distance between a center of the containment roller and a center of the metering bar is 2.97 inches.

13. The liquid film coating machine of claim 1 wherein the metering bar has a diameter within 50% to 200% of one-and-a-half inches.

14. The liquid film coating machine of claim 13 wherein the metering bar diameter is one-and-a-half inches.

15. The liquid film coating machine of claim 1 wherein a center of the metering bar is positioned below a center of the coated roller and a top of the metering bar is set below the center of the coated roller.

* * * * *